US008775258B1

(12) United States Patent
Mick, Jr. et al.

(10) Patent No.: US 8,775,258 B1
(45) Date of Patent: Jul. 8, 2014

(54) THIRD PARTY SERVER FOR VERIFYING INVENTORY SPLITS

(71) Applicant: This Technology, Inc., Denver, CO (US)

(72) Inventors: John Raymond Mick, Jr., Sunnyvale, CA (US); Jeffrey Sherwin, Scarsdale, NY (US)

(73) Assignee: This Technology, Inc., Denver, CO (US)

( * ) Notice: Subject to any disclaimer, the term of this patent is extended or adjusted under 35 U.S.C. 154(b) by 0 days.

(21) Appl. No.: 13/875,576

(22) Filed: May 2, 2013

(51) Int. Cl.
*G06Q 30/00* (2012.01)
*H04N 21/81* (2011.01)

(52) U.S. Cl.
CPC ................................. *H04N 21/812* (2013.01)
USPC ....................... 705/14.7; 705/14.4; 705/14.69

(58) Field of Classification Search
None
See application file for complete search history.

(56) References Cited

U.S. PATENT DOCUMENTS

| | | | |
|---|---|---|---|
| 8,069,464 B2 * | 11/2011 | Pickens et al. ............ | 725/95 |
| 8,468,563 B1 * | 6/2013 | Sherwin et al. ............. | 725/36 |
| 2008/0271070 A1 * | 10/2008 | Kanojia et al. ............ | 725/32 |
| 2009/0025026 A1 * | 1/2009 | Mick et al. ............... | 725/32 |
| 2009/0150930 A1 * | 6/2009 | Sherwin et al. ............ | 725/35 |
| 2009/0171784 A1 * | 7/2009 | Morgan et al. ............ | 705/14 |
| 2010/0269132 A1 * | 10/2010 | Foti ....................... | 725/32 |
| 2011/0030002 A1 * | 2/2011 | Foti ....................... | 725/32 |
| 2011/0047567 A1 * | 2/2011 | Zigmond et al. ........... | 725/32 |
| 2012/0079527 A1 * | 3/2012 | Trimper et al. ............ | 725/31 |
| 2013/0254041 A1 * | 9/2013 | Sherwin et al. ........... | 705/14.68 |
| 2013/0276025 A1 * | 10/2013 | Sherwin et al. ............ | 725/35 |
| 2013/0276026 A1 * | 10/2013 | Sherwin et al. ............ | 725/35 |

* cited by examiner

*Primary Examiner* — John G Weiss
*Assistant Examiner* — Meredith A Long
(74) *Attorney, Agent, or Firm* — Lowenstein Sandler LLP

(57) ABSTRACT

A method and system for verifying inventory splits is disclosed. A server retrieves from a memory a first inventory policy provided by a first content provider. The server retrieves from the memory a second inventory policy provided by the second content provider. The server verifies that the first inventory policy and the second inventory policy are in agreement for at least one stipulation pertaining to a percentage of compensation to the first content provider for inventory owned by the first content provider and played by the second content provider. The server transmits the first inventory policy to a placement opportunity information service (POIS) communicatively connected to the second content provider. The server transmits the second inventory policy to a placement opportunity information service (POIS) communicatively connected to the first content provider.

22 Claims, 5 Drawing Sheets

THIRD PARTY SERVER FOR VERIFYING INVENTORY SPLITS

FIELD OF THE INVENTION

The present invention relates generally to service provider video networks, and more particularly to a method and system for verifying inventory splits.

BACKGROUND OF THE INVENTION

Web pages connected to the Internet may be configured to provide advertisement placement opportunities. When a user of the Internet accesses a commercial Web site, the user may be greeted with a popup advertisement, portions of the viewing screen occupied by fixed or animated advertisements, scrolling banners, or fixed or moving advertisements that appear when the user clicks on links or performs steps in a purchase. Internet advertisement opportunities appear based on space, time, content, and user context and may be highly non-linear (i.e., the user chooses to initiate the playing of content and in response, the content starts).

Traditionally, programming of broadcast and cable television and radio, including content (i.e., the video or audio program) and (the placement of) ads in a video or audio signal stream, has followed a linear model. Programming may be linear in the sense that a program begins and is streamed and in progress when a user chooses to view entertainment content. FIG. 1 illustrates a conventional linear or video-on-demand (VOD) model for advertisement placement. Entertainment content 2, when processed as a digital data stream over a cable network, may be divided into a number of time intervals. The time intervals 4 include time reserved for a viewed program (content), such as "Golden Girls." The intervals 6, 8, 9, represent sections of time reserved for advertisements or "avails." These "avails" may be viewed as advertisement placement opportunities. As used herein, a "placement opportunity" was traditional called an avail and is sometimes referred to as a slot (into which a spot (e.g., an ad or content) is to be inserted). A placement opportunity (PO) is a construct that represents an opportunity to insert an advertisement or entertainment content, and defines the rules for that opportunity, such as its duration, interactivity, ownership, and technical constraints.

As used herein, a "spot" is an ad placed in a placement opportunity.

As used herein, the term "binding" refers to an identification of signals and content within a placement opportunity (PO). PO's are frequently created for broad amounts of content that are not yet published (i.e., any show on TNT network in the evening). When the show airs and a signal is detected, the signal is bound to the relevant PO's for that show.

As used herein, the term "impression" refers to a showing of an advertisement to a single viewer. For example, if a 30 second spot is placed in 50,000 video-on-demand (VOD) streams and it is known that 30,000 of the streams actually played the ad, then 30,000 impressions of that advertisement have been generated.

As used herein, a "status notification" may be, but is not limited to, an HTTP call from a VOD server with a unique ID that was created when a decision was delivered.

As used herein, the term "break" refers to all of the space in a stream between entertainment content. For example, a group of 4 consecutive 30 second spots between 2 segments of "Two and a Half Men" may be considered as a single break.

As used herein, an estimated starting location of a break in a signal stream is referred to as a signal point. In the context of advertisement placement, these signal points may be referred to as advertisement signal points.

In non-linear systems, such as Video-on-Demand (VOD), the intervals 6, 8, 9 may take on new meanings. The interval 6 is called a pre-roll, i.e., the space in a video that occurs immediately after a user clicks to start a VOD video. The interval 9 is known as a post-roll, i.e., the space after all of the VOD video segments have finished playing. The intervals 8 may be mid-rolls, i.e., mini-breaks in the middle of a VOD video, or may be interstitials, i.e., pod-like locations between consecutive VOD video segments. VOD advertisement placement opportunities may appear based on space, time, content, and user context and may be highly non-linear (i.e., the user chooses to initiate the playing of content and in response, the content starts). All of the intervals 6, 8, 9 in such play lists are ripe for the insertion of advertisements, i.e., advertisement placement opportunities.

In the traditional model for the placement of ads in television programming, avails are specified by a simple combination of channel and time and decided weeks ahead of broadcast. However, new cable content delivery systems permit advertising spots of varying duration, permit different levels of interactivity (e.g., polling or linking) through the use of buttons on a remote control, may be defined by geography, etc. In a world where TV viewing is becoming increasingly non-linear (e.g., video-on-demand (VOD), networked-based personal video recorders (PVR), interactive programs), a key goal of advertisement opportunity placement systems is to determine how to define placement opportunities that are non-deterministic and manifest dynamically. Advanced advertising needs to accommodate advertisement placement opportunities that are invoked by user events, which may include anything from playback of a VOD title to pausing one's DVR. As the scope of potential placement opportunities expands accordingly, it becomes necessary to precisely define those placement opportunities with attributes representing relevant business rules. These may be used to specify such things as inventory splits, quantity, duration, and position of ad breaks (pre-roll, mid-roll, post-roll); placement of pause ads and overlays; and levels and types of interactivity.

On the Internet, a content publisher and an advertiser may be isolated from one another, with an advertising network acting as an intermediary. On TV, the advertising network was formerly the national network, the cable network, or the cable operator, that had fixed avails. However, emerging advanced advertising standards for dynamic television provide an opportunity for content providers to derive value from a cable operator's ad placement infrastructure by creating new and more flexible advertising inventory (i.e., Potential Viewership*Placement Opportunities=Advertising Inventory). This new business model imposes unique technical challenges: unlike the Internet, where browsers access/display content and then are separately "referred" to a shared ad network, the cable television infrastructure selects and assembles both the advertisement and the content together in the network and delivers the combined result to customers' set top boxes. For this to work, cable television advanced advertising networks may at least partially operate within the infrastructure of a Multiple System/Service Operator (MSO—a cable TV organization that owns more than one cable system and may prove broadband Internet service). To achieve optimal addressability and user experience and achieve bandwidth efficiencies, advertising service elements and digital delivery components need to be located close to the edge of a network, i.e., at or near set top boxes. Decisions need to be made based upon relevant context (infrastructure, platform, content, geography, demographics, etc.), which are applicable to non-advertisements as well (e.g., suggested content). By making placement decisions and insertions at the time of a user request—or even at the appropriate times during content playout—fully dynamic ad placement may be achieved.

FIG. 2 depicts a configuration of a conventional Internet-based cable television infrastructure 200 for performing advertising placement decisions in signal streams for both an MSO 202a (e.g., Comcast) and a network provider 202b (e.g., "ABC") each providing Internet-based television. Unlike the Internet, where browsers access/display content and then are separately "referred" to a shared advertisement network, the Internet-based television infrastructure 200 selects and assembles both the advertisement and the content together and delivers the combined result to customers' "smart appliances" 204a-204n (e.g., Internet ready televisions, radios, smartphones, tablets, PCs, etc.).

Smart appliances 204a-204n, such as Internet-ready televisions, have become capable of receiving content from Internet streaming services, such as Netflix movies, Pandora streaming radio, etc., over WiFi or direct Ethernet connections. When a user clicks on an icon for an "app" that appears on the television set corresponding to one of these services, the content is streamed to the smart appliance 204a-204n from a content delivery network (CDN) 206a, 206b directly to the application running in the smart appliance 204a-204n without the need for a set top box.

A set top box may be configured to decode an analog representation of two states of a digital signal, as is known in the art, that is continuously streamed and pushed to the set top box through a broadcast facility over a coaxial or fiber optic cable and the set top box tunes to that channel and displays the content. When a user watches Internet-delivered program content, a browser within the smart appliance 204a-204n fetching video in predetermined time chunks—generally two sometimes three, sometimes ten second chunks. The fetched chunks of video are seamlessly stitched together dynamically in the application software of the smart appliance 204a-204n and then displayed so as to appear as a smooth video on the smart appliance 204a-204n.

The MSO 202a or network 202b may wish to rebroadcast video streams on smart appliances. Unfortunately, every connected device, including smart appliances, needs to obtain video in the format that it can consume. Apple, Microsoft, Adobe, etc., have very specific and incompatible formats. To overcome this problem, each of these companies has constructed facilities called content delivery networks (CDN) 206a, 206b where a "set top box" for each channel is configured to receive broadcasts from satellites 208a, 208b. A signal received by a "set top box" from upstream devices 210a, 210b communicatively connected to the satellites 208a, 208b is fed to transcoders 212a, 212b to place the signal in a desired format and to fragment the formatted signal into the predetermined (e.g., 2 second) segments of data. These segments are then stored at the CDNs 206a, 206b on server farms located in the vicinity of where the content is to be delivered.

MSOs 202a and Content Networks 202b often share ad space or inventory in a video streams. As described above, placement opportunities on broadcasted streams may be delineated by distinct 30 second spots where each owner can place an ad from their media business. In Unicast streams where the same video may be watched by multiple parties, placement opportunities may be "split" among one or more MSOs 202a and/or Content Networks 202b according to agreed-upon percentages. These so-called "percentage splits" or "inventory splits" may be agreed to by the MSO 202a and a Content Network 202b (e.g., 20% is for the MSO), wherein, for example, an MSO 202a may be granted 20% of the avails.

During deliver of the content (e.g., video, audio, data, etc.), advertisements may be dynamically inserted into the content in certain locations in the content called ad breaks. Content provider routers 214a, 214b under the control of an associated ad service (ADS) 216a, 216b dynamically insert the advertisements into the content provided by the CDNs 206a, 206b before delivery to the smart appliances 204a-204n.

If a service provider is an MSO 202a, such as Comcast, the MSO 202a may provide a customer with an application (hereinafter an "app") to permit viewing of content from a plurality of networks (e.g., ABC). When a customer "clicks" on a Comcast app icon, the customer may watch, after logging into the Comcast app, all of the content provided by Comcast, including, but not limited to ABC. When the customer "clicks" on an app icon provided directly by a content network 202b (e.g., ABC), the customer, after logging into the ABC app, may watch ABC network content provided in a customized way, but still of the same content as provided with the Comcast app. The login information permits CDNs 206a, 206b to identify an account to give credit for the customer playing content and advertisements to generate revenue.

Although ABC, in effect, is bypassing Comcast, ABC would like not to hurt its relationship with Comcast or affiliates. Therefore, ABC may compensate Comcast even when a user is viewing ABC over the ABC app instead of the Comcast app.

Both Comcast and ABC may have similar data paths through equipment and the Internet, but the ABC data path may bypass the CDN 204a associated with Comcast to a second CDN 206b associated with ABC that may be a bit further away from the CDN 206a of Comcast. The user is also logged into the content provider router 214b associated with ABC instead of the content provider router 214a associated with Comcast. The ADS 216a employed for dynamic ad insertion for the data path of Comcast may be encoded to provide a 20 percent inventory split between Comcast and ABC. The ADS 216b employed for dynamic ad insertion for the data path of ABC may be encoded to initially provide a 0 percent inventory split between Comcast and ABC. However, Comcast may believe it is entitled to the same 20% split or at least a 10% split using its own ADS 216a.

Because the ADS 216a and the ADS 216b cannot "see" each other, less than advantageous splits for one party may result (e.g., ABC may be willing to provide Comcast with a 20% inventory split, but only during non-primetime hours).

Accordingly, what would be desirable, but has not yet been provided, is a system and method for managing and verifying inventory splits.

SUMMARY OF THE INVENTION

The above-described problems are addressed and a technical solution is achieved in the art by providing a method and system for verifying inventory splits. A server retrieves from a memory a first inventory policy provided by a first content provider. The server retrieves from the memory a second inventory policy provided by the second content provider. The server verifies that the first inventory policy and the second inventory policy are in agreement for at least one stipulation pertaining to a percentage of compensation to the first content provider for inventory owned by the first content provider and played by the second content provider. The server transmits the first inventory policy to a placement opportunity information service (POIS) communicatively connected to the second content provider. The server transmits the second inventory policy to a placement opportunity information service (POIS) communicatively connected to the first content provider.

In an embodiment, the first inventory policy and the second inventory policy may include, for example, positional preferences, ad loads, and inventory splits.

In an example, before transmitting the first inventory policy to a second content provider, the server may receive an authorization of the first inventory policy from the second content provider. Before transmitting the second inventory policy to the first content provider, the server may receive an authorization of the second inventory policy from the first content provider.

In an example, the at least one stipulation pertaining to a percentage of compensation may comprise at least one stipulation pertaining to percentages of ownership of inventory. The at least one stipulation pertaining to percentages of ownership of inventory may be based on at least one of measuring a number of requests for placement opportunities, measuring actual split percentages of types of placement opportunities, and calculating percentages of placement opportunities based on received status notifications.

The at least one stipulation pertaining to percentages of ownership of inventory may be enforced by a first POIS communicatively connected to the first content provider and a second POIS communicatively connected to the second content provider. In an example, the first content provider router may be coupled between the first POIS and a first ADS owned by the first content provider. The content provider router may be coupled between the second POIS and a second ADS owned by the second content provider.

The server may transmit first data between the first POIS and the first ADS, and the server may transmit second data between the second POIS and the second ADS. The first data and the second data provide information for enforcing the at least one stipulation pertaining to percentages of ownership of inventory.

At least one of the first content provider or the second content provider may be a multiple system/service operator (MSO). At least one of the first content provider or the second content provider may be a programming network.

In an embodiment, inventory may comprise advertisement placement opportunities. The advertisement placement opportunities may be dynamically insertable advertisement placement opportunities.

In an embodiment, inventory may comprise inventory may comprise content. The content may comprise video, audio, data, or an interactive overlay.

In an embodiment, at least one of the first inventory policy or the second inventory policy may apply to internet-based transmission of inventory. At least one of the first inventory policy or the second inventory policy may apply to video-on-demand cable, optical, or over-the-air transmission of inventory.

BRIEF DESCRIPTION OF THE DRAWINGS

The present invention will be more readily understood from the detailed description of exemplary embodiments presented below considered in conjunction with the attached drawings, of which.

Figure 1:
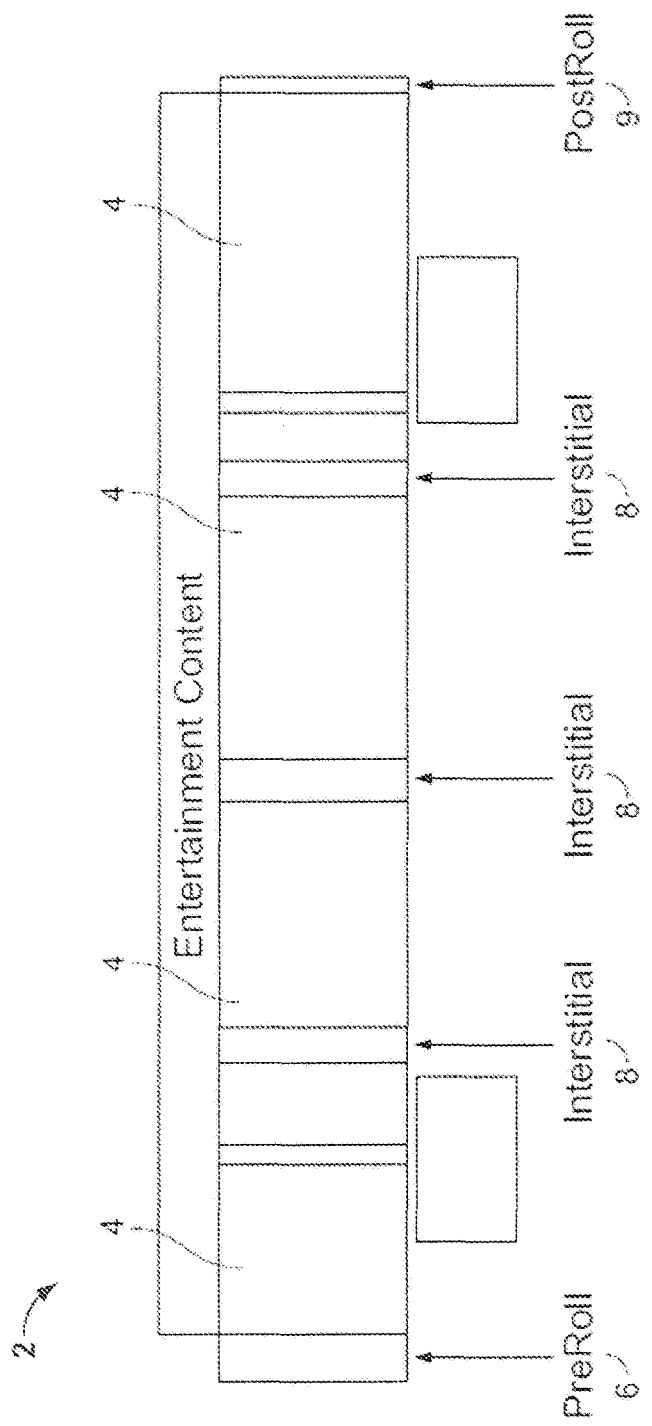
FIG. 1 illustrates a conventional linear or video-on-demand model for advertisement placement.
Figure 2:
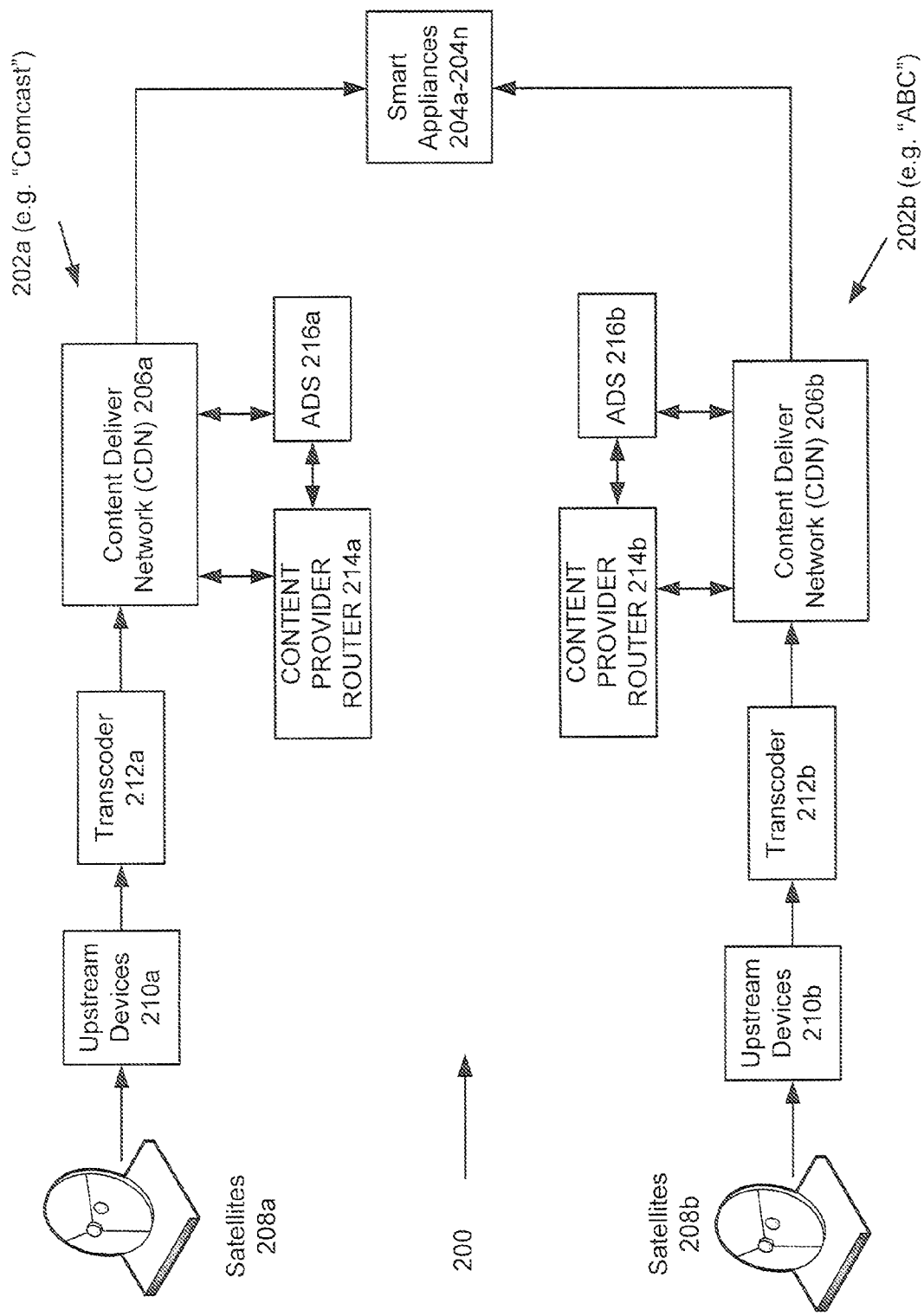
FIG. 2 depicts a configuration of a conventional Internet-based cable television infrastructure for performing advertising placement decisions in signal streams.

It is to be understood that the attached drawings are for purposes of illustrating the concepts of the invention and may not be to scale.

DETAILED DESCRIPTION OF THE INVENTION

Certain embodiments of the present disclosure are compatible with and make use of elements defined according to the SCTE-130 standard. The SCTE-130 standard provides a standardized and extensible message based interface defining a minimal set of cooperating logical services necessary to communicate placement opportunities, placement decisions, and placement related event data necessary for accountability measurements. SCTE-130 defines an extensible framework of interfaces among a set of advertising system logical services. The SCTE-130 standard encompasses: a minimal set of cooperative logical services needed to implement advanced addressable advertising systems; the core data types and extensible message framework forming a vocabulary needed to communicate among the defined logical services; the interfaces among these logical services using the core data types and messages; and, mechanisms for extensibility that allow innovation while preserving backward compatibility with already deployed systems—thereby reducing the complexity for incorporating new features within the standard.

The normative parts of the SCTE-130 standard define mechanisms for integrating systems implementing features such as VOD-based advertising, linear-based advertising, enhanced advertising capabilities such as advertisement rotation groups (rotation groups refer to placement opportunities that run in rotation so that the same ad is not viewed again immediately), subscriber-based addressing for advertising or content tailoring, extension points for more advanced advertising or addressing features, logical services that are implemented as one or more physical systems created by the same vendor, deployment of a logical service that may simultaneously include systems from one or more vendors, and an implementation that may incorporate one or more of the defined logical services and interfaces The SCTE-130 standard defines a set of logical services comprising an advanced advertising system. Each logical service may itself be a complex system. In an embodiment, one or more of the following logical services may be used by or interact with certain embodiments of the present invention.

An Advertisement Management Service (ADM) defines messages in support of advertisement insertion activities. The primary consumer of these messages is an Advertisement Decision Service (ADS). The message interfaces exposed by an ADM permit both pre-configured advertisement decisions as well as real-time fulfillment models. An ADM implementation may incorporate some simple advertisement selection rules (e.g., advertisement rotations) but more complex advertisement decisions are the responsibility of an ADS.

An Advertisement Decision Service (ADS) determines how advertising content is combined with non-advertising (i.e., entertainment) content assets. The decisions made by an ADS may be straightforward (i.e., specific advertisement content placed at a specific time in a specific asset) or arbitrarily complex (based on subscriber data, advertising zone, etc.).

A Content Information Service (CIS) manages metadata describing assets (both advertising assets and non-advertising assets) available to the other SCTE-130 logical services. The CIS provides query and notification interfaces to the other logical services. The query service is available on an ad-hoc basis and may be called by any other logical service at any time without any prior registration. Queries specify values or patterns to be sought in the query message metadata and the specified matching information (or an error indication) is returned in a response message.

The Content Information Service (CIS) is a storage and distribution engine. It stores metadata about entertainment and advertising assets; provides notifications to registered clients when metadata is modified; registers, receives and processes notifications from other CIS services; and supports real-time metadata queries. The CIS permits an Advertising Manager (ADM) and/or Advertisement Decision Service (ADS) to retrieve and utilize content metadata in their advanced advertising decision processing.

A Placement Opportunity Information Service (POIS) may hold, maintain, and retain descriptions of placement opportunities. The POIS may also contain attributes and constraints for each placement opportunity, platform compliance, rights, and policies of the content in which the placement opportunity exists. These placement opportunities are content specific, therefore attributes and constraints may vary by network, geographic region, or other content distribution dimension.

The POIS is a Placement Opportunity (PO) storage and inventory execution engine. It stores PO metadata and statistics; provides notifications to registered clients when PO metadata is modified; registers, receives and processes notifications from other POIS services; and supports real-time PO metadata queries. Through the POIS appliance, an Advertising Manager (ADM) and/or Advertisement Decision Service (ADS) can retrieve and utilize placement opportunity metadata in their advanced advertising decision making.

The Subscriber Information Service (SIS) manages per-subscriber information relevant to advertisement placement decisions. The SIS provides a mapping between subscriber or client identifiers, such as a MAC address, serial number, etc., and subscriber or audience attributes, e.g., age, sex, location of a subscriber.

The term "computer" or "computer platform" is intended to include any data processing device, such as a desktop computer, a laptop computer, a tablet computer, a mainframe computer, a server, a handheld device, a digital signal processor (DSP), an embedded processor (an example of which is described in connection with FIG. 5), or any other device able to process data. The computer/computer platform is configured to include one or more microprocessors communicatively connected to one or more non-transitory computer-readable media and one or more networks. The term "communicatively connected" is intended to include any type of connection, whether wired or wireless, in which data may be communicated. The term "communicatively connected" is intended to include, but not limited to, a connection between devices and/or programs within a single computer or between devices and/or separate computers over a network. The term "network" is intended to include, but not limited to, OTA (over-the-air transmission, ATSC, DVB-T), packet-switched networks (TCP/IP, e.g., the Internet), satellite (microwave, MPEG transport stream or IP), direct broadcast satellite, analog cable transmission systems (RF), and digital video transmission systems (ATSC, HD-SDI, HDMI, DVI, VGA), etc.

Figure 3:
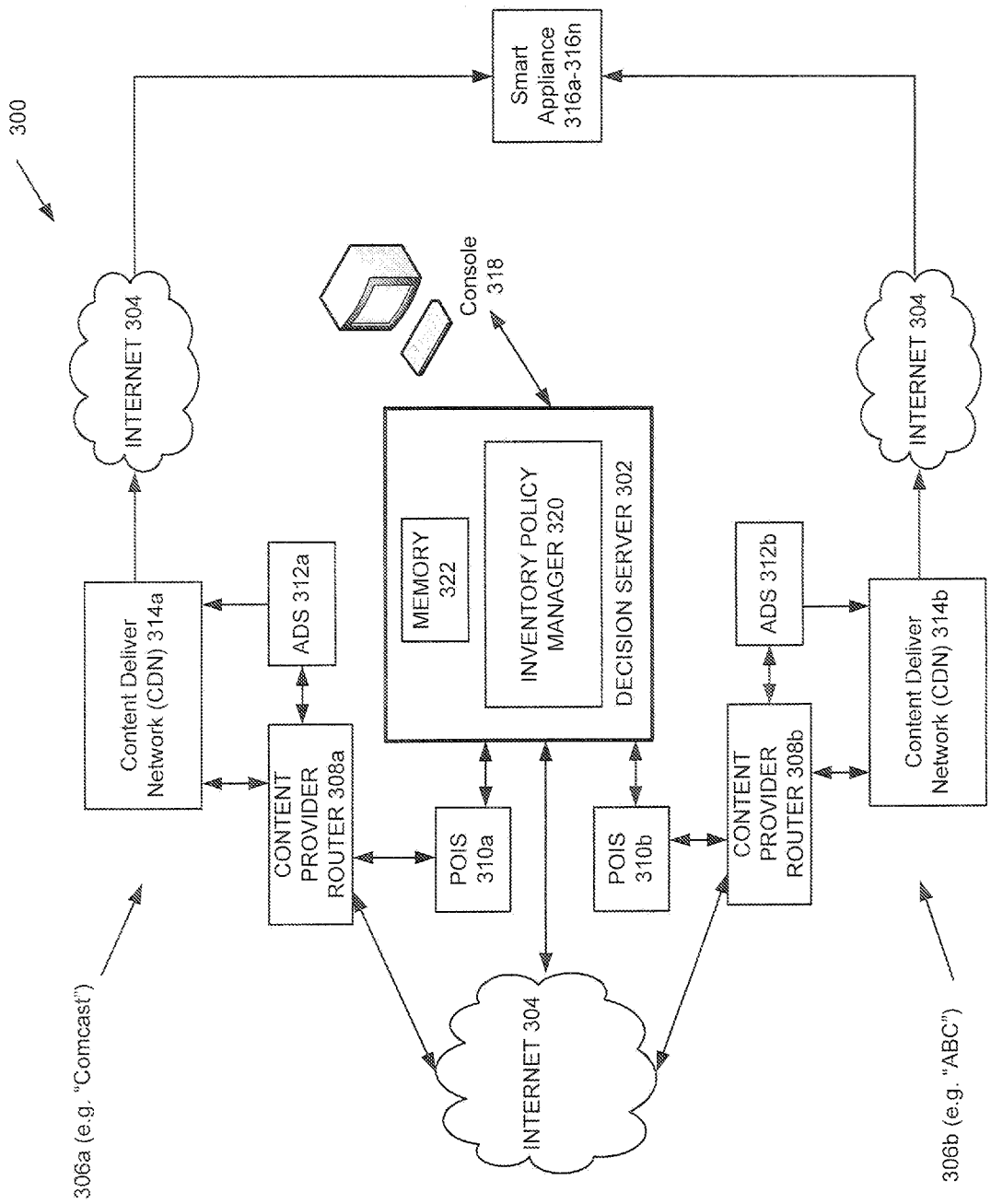
FIG. 3 depicts a configuration of one embodiment for verifying inventory splits.

FIG. 3 depicts a configuration of a system 300 for verifying inventory splits. The system 300 may be executed by a decision server 302, interconnected by one or more networks (e.g., the Internet 304) to a content provider system 306a (hereinafter "the first content provider 306a") under the control of content provider router 308a, and to a content provider system 306b (hereinafter "the second content provider 306b") under the control of content provider router 308b. The decision server 302 is further communicatively connected to a POIS 310a associated with the first content provider system 306a and a POIS 310b associated with the second first content provider system 306b. The POIS 310a is configured to store an inventory policy associated with the second content provider 306b and the POIS 310b is configured to store an inventory policy associated with the first content provider 306a. The first content provider 306a is further provided with an ADS 312a under the control of the content provider router 308a for placing advertisements into advertisement breaks in subscriber data streams stored on an associated CDN 314a for delivery to one or more smart appliances 316a-316n over a network (e.g., the Internet 304).

The decision server 302 is configured to act as a neutral third party for facilitating and verifying inventory split agreements between the first content provider 306a and the second content provider 306b. To facilitating and verifying inventory split agreements, the decision server 302, in one embodiment, implements an inventory policy manager 320 and a console 318 to permit an administrator (not shown) to author an inventory policy associated with the first content provider 306a and to authorize an inventory policy associated with the second content provider 306b under the control of the decision server 302. The console 318 is also provided to permit the administrator to author an inventory policy associated with the second content provider 306b and to authorize an inventory policy associated with the first content provider 306a under the control of the decision server 302.

In one embodiment, the inventory policy manager 320 is configured to receive a first policy pertaining to inventory provided by a first content provider 306a and store the first inventory policy in a memory 322, transmit the first policy to a second content provider 306b, and to receive an authorization of the first policy from the second content provider 306b. The inventory policy manager 320 is further configured to receive a second policy pertaining to inventory provided by the second content provider 306b and store the second inventory policy in the memory 322, transmit the second policy to the first content provider 306a, and receive an authorization of the second policy from the first content provider 306a. The inventory provided by the first content provider 306a and the inventory provided by the second content provider 306b may comprise the same inventory. The inventory policy manager 320 is further configured to verify that the first inventory policy and the second inventory policy are in agreement for at least one stipulation pertaining to a percentage of compensation to the first content provider 306a for inventory owned by the first content provider 306a and played by the second content provider 306b. The inventory policy manager 320 is further configured to transmit the first inventory policy to a placement opportunity information service (POIS) 310b communicatively connected to the second content provider 306b, and to transmit the second inventory policy to a placement opportunity information service (POIS) 310a communicatively connected to the first content provider 306a.

The at least one stipulation pertaining to percentages of compensation/ownership of inventory may be enforced by the POISs 310*a* and 310*b*. The first content provider router 308*a* is configured to transmit first data between the POIS 310*a* and the ADS 312*a* owned by the first content provider 306*a*, and the content provider router 308*b* is configured to transmit second data between the POIS 310*b* and the ADS 312*b* owned by the second content provider 306*b*. The first data and the second data provide information for enforcing the at least one stipulation pertaining to percentages of ownership of inventory.

Figure 4:
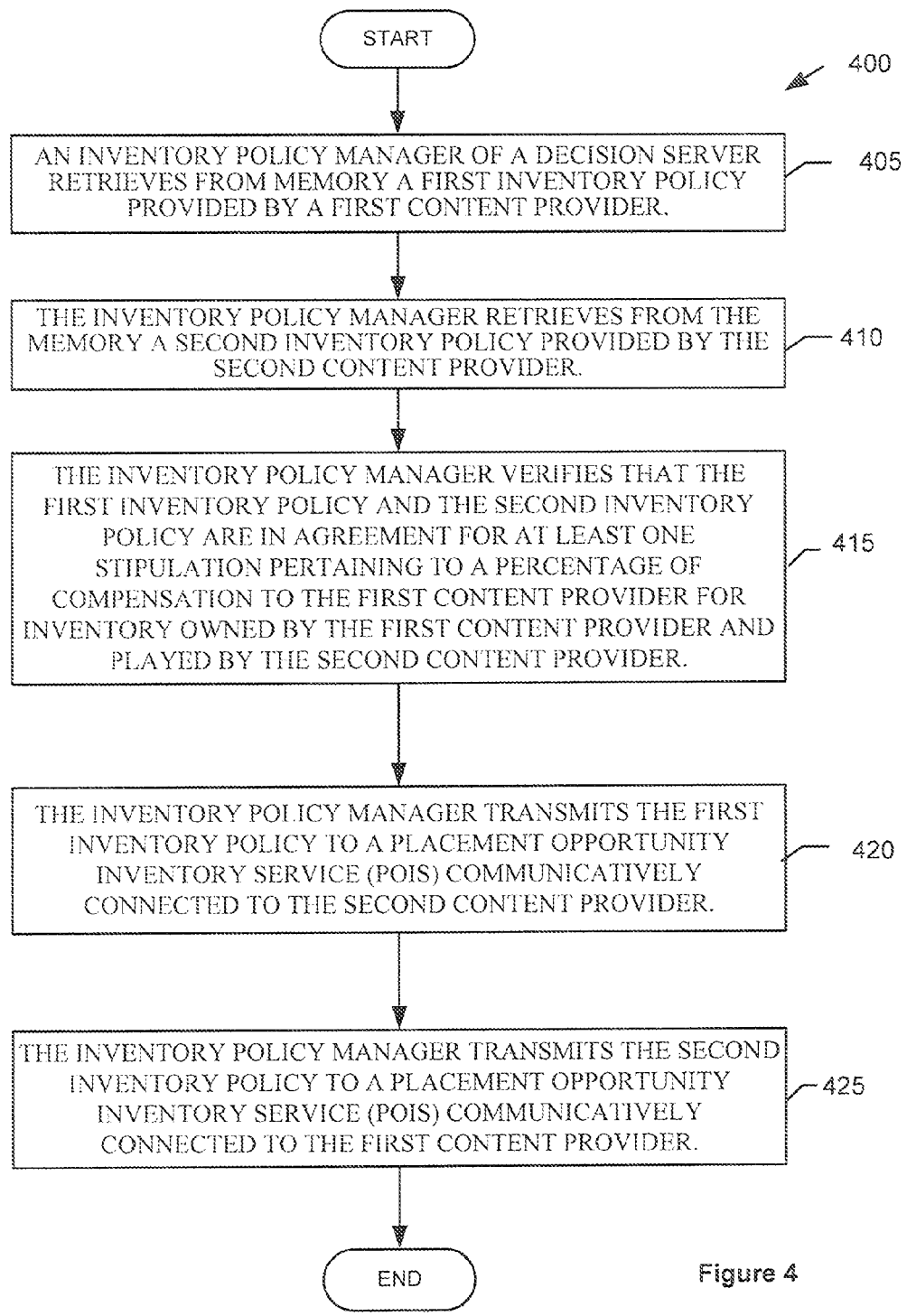
FIG. 4 is a flow diagram illustrating one embodiment of a method for verifying inventory splits.

FIG. 4 is a flow diagram illustrating an example of a method 400 for verifying inventory splits. The method 400 may be performed by a computer system 500 of FIG. 5 and may comprise hardware (e.g., circuitry, dedicated logic, programmable logic, microcode, etc.), software (e.g., instructions run on a processing device), or a combination thereof. In one example, the method 400 is performed by inventory policy manager 320 of the decision server 302 of FIG. 3.

In one embodiment, method 400 begins when, at block 405, the inventory policy manager 320 of the decision server 302 retrieves from memory 322 a first inventory policy provided by a first content provider 306*a*. The first inventory policy may include, for example, positional preferences, ad loads, and inventory splits. At block 410, the inventory policy manager 320 retrieves from the memory 322 a second inventory policy provided by the second content provide 306*b*. The second inventory policy may include, for example, positional preferences, ad loads, and inventory splits.

At block 415, the inventory policy manager 320 verifies that the first inventory policy and the second inventory policy are in agreement for at least one stipulation pertaining to a percentage of compensation to the first content provider 306*a* for inventory owned by the first content provider 306*a* and played by the second content provider 306*b*.

At block 420, the inventory policy manager 320 transmits the first inventory policy to a placement opportunity information service (POIS) 310*b* communicatively connected to the second content provider 306*b*. At block 425, the inventory policy manager 320 transmits the second inventory policy to a placement opportunity inventory service (POIS) 310*a* communicatively connected to the first content provider 306*a*.

In an example, before transmitting the first inventory policy to a second content provider 306*b*, the inventory policy manager 320 may receive an authorization of the first inventory policy from the second content provider 306*b* and before transmitting the second inventory policy to the first content provider 306*a*, the inventory policy manager 320 may receive an authorization of the second inventory policy from the first content provider 306*a*.

In an example, the at least one stipulation pertaining to a percentage of compensation may comprise at least one stipulation pertaining to percentages of ownership of inventory. The at least one stipulation pertaining to percentages of ownership of inventory may be based on at least one of measuring a number of requests for placement opportunities, measuring actual split percentages of types of placement opportunities, and calculating percentages of placement opportunities based on received status notifications.

The at least one stipulation pertaining to percentages of ownership of inventory may be enforced by the POIS 310*a* communicatively connected to the first content provider 306*a* and the POIS 310*b* communicatively connected to the second content provider 306*b*. In an example, the first content provider router 308*a* may be coupled between the first POIS 310*a* and the ADS 312*a* owned by the first content provider 306*a* and the content provider router 308*b* may be coupled between the second POIS 310*b* and the AS 312*b* owned by the second content provider 306*b*.

The first content provider router 308*a* may transmit first data between the POIS 310*a* and the ADS 312*a*, and the content provider router 308*b* may transmit second data between the POIS 310*b* and the ADS 312*b*. The first data and the second data provide information for enforcing the at least one stipulation pertaining to percentages of ownership of inventory.

In an embodiment, the POISs 310*a*, 310*b* may bind placement opportunities (POs) to the signals of the content based in part on the agreed upon inventory policy. The POISs 310*a*, 310*b* each have knowledge of the desired inventory load, split, and positional preferences for that content and others in the same context to which the agreed upon inventory policy are applicable before any stream has ever been requested. For all content available covered by the agreed upon inventory policy, the respective content provider routers 308*a*, 308*b* bind POs to the signals of the content according to the agreed upon inventory percentages using their respective ADSs 312*a*, 312*b*. The ADSs 312*a*, 312*b* are configured to insert advertisements into placement opportunities into content provided by respective CDNs 314*a*, 314*b*. Once inserted, the respective content provider routers 308*a*, 308*n* may initiate transmission of inventory to the smart devices 316*a*, 316*n*.

Figure 5:
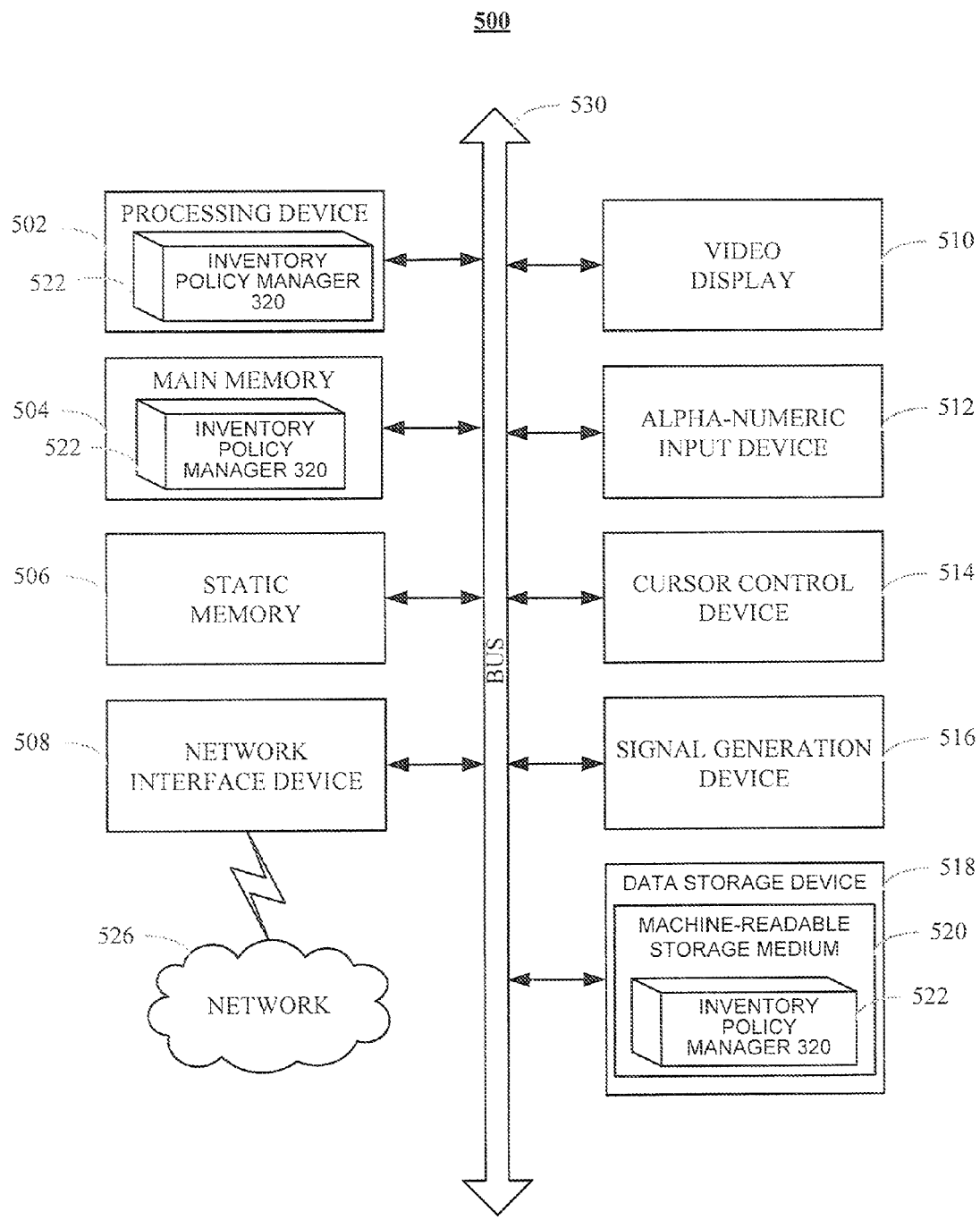
FIG. 5 illustrates a diagrammatic representation of a machine in the exemplary form of a computer system within which a set of instructions, for causing the machine to perform any one or more of the methodologies discussed herein, may be executed.

FIG. 5 illustrates a diagrammatic representation of a machine in the example form of a computer system 500 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The inventory policy manager 320 shown in FIG. 3 may be executed by processor 502 configured to perform the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable medium 520 on which is stored one or more sets of instructions 522 (e.g., instructions of the inventory policy manager 320) embodying any one or more of the methodologies or functions described herein. The instructions 522 of the inventory policy manager 320 may also reside, completely or at least partially, within the main memory 504 and/or within the processor 502 during execution thereof by the computer system 500, the main memory 504 and the processor 502 also constituting computer-readable media. The instructions 522 of the inventory policy manager 320 may further be transmitted or received over a network 526 via the network interface device 508.

While the computer-readable storage medium 520 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "writing", "maintaining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
retrieving, by a server from a memory, a first inventory policy provided by a first content provider;
retrieving, by the server from a memory, a second inventory policy provided by the second content provider;
verifying, by the server, that the first inventory policy and the second inventory policy are in agreement for at least one stipulation pertaining to a percentage of compensation to the first content provider for inventory owned by the first content provider and played by the second content provider;
transmitting, by the server, the first inventory policy to a second placement opportunity information service (POIS) communicatively connected to the second content provider; and
transmitting, by the server, the second inventory policy to a first placement opportunity information service (POIS) communicatively connected to the first content provider.

2. The method of claim 1, further comprising:
before transmitting the first inventory policy to a second content provider, receiving, by the server, an authorization of the first inventory policy from the second content provider;
before transmitting the second inventory policy to the first content provider, receiving, using the server, an authorization of the second inventory policy from the first content provider.

3. The method of claim 1, wherein the at least one stipulation pertaining to a percentage of compensation comprises at least one stipulation pertaining to percentages of ownership of inventory.

4. The method of claim 3, wherein the at least one stipulation pertaining to percentages of ownership of inventory is based on at least one of measuring a number of requests for placement opportunities, measuring actual split percentages of types of placement opportunities, and calculating percentages of placement opportunities based on received status notifications.

5. The method of claim 3, wherein the at least one stipulation pertaining to percentages of ownership of inventory is enforced by the second placement opportunity information service communicatively connected to the second content provider and the first placement opportunity information service communicatively connected to the first content provider.

6. The method of claim 5, wherein a first router is coupled between the first placement opportunity information service and an advertisement decision service owned by the first content provider and wherein a second router is coupled between the second placement opportunity information service and an advertisement decision service owned by the second content provider.

7. The method of claim 6,
wherein the first router transmits first data between the first placement opportunity information service and the advertisement decision service owned by the first content provider,
wherein the second router transmits second data between the second placement opportunity information service and the advertisement decision service owned by the second content provider, and
wherein the first data and the second data provide information for enforcing the at least one stipulation pertaining to percentages of ownership of inventory.

8. The method of claim 1, wherein at least one of the first content provider or the second content provider is a multiple system/service operator (MSO).

9. The method of claim 1, wherein at least one of the first content provider or the second content provider is a programming network.

10. The method of claim 1, wherein inventory comprises advertisement placement opportunities.

11. The method of claim 10, wherein the advertisement placement opportunities are dynamically insertable advertisement placement opportunities.

12. The method of claim 1, wherein the inventory comprises content.

13. The method of claim 1, wherein at least one of the first inventory policy or the second inventory policy apply to internet-based transmission of inventory.

14. The method of claim 1, wherein at least one of the first inventory policy or the second inventory policy applies to video-on-demand cable, optical, or over-the-air transmission of inventory.

15. The computer-implemented method of claim 1, wherein designated time interval for placement opportunities corresponds to breaks, pre-rolls, post-rolls, mid-rolls, interstitials, pauses, and video-on-demand requests.

16. A system, comprising:
a memory;
a processing device, coupled to the memory, the processing device to:
retrieve, from the memory, a first inventory policy provided by a first content provider;
retrieve, from the memory, a second inventory policy provided by the second content provider;
verify that the first inventory policy and the second inventory policy are in agreement for at least one stipulation pertaining to a percentage of compensation to the first content provider for inventory owned by the first content provider and played by the second content provider;
transmit the first inventory policy to a second placement opportunity information service (POIS) communicatively connected to the second content provider; and
transmit the second inventory policy to a first placement opportunity information service (POIS) communicatively connected to the first content provider.

17. The system of claim 16, further comprising a console communicatively connected to the server, wherein at least one of the first inventory policy or the second inventory policy are authored or authorized using the console.

18. The system of claim 16, wherein the at least one stipulation pertaining to a percentage of compensation comprises at least one stipulation pertaining to percentages of ownership of inventory.

19. The system of claim 18, wherein the at least one stipulation pertaining to percentages of ownership of inventory is based on at least one of measuring a number of requests for placement opportunities, measuring actual split percentages of types of placement opportunities, and calculating percentages of placement opportunities based on received status notifications.

20. The system of claim 19, further comprising:
a first router is coupled between the first placement opportunity information service and an advertisement decision service owned by the first content provider and
a second router is coupled between the second placement opportunity information service and an advertisement decision service owned by the second content provider,
wherein the at least one stipulation pertaining to percentages of ownership of inventory is enforced by the second placement opportunity information service communicatively connected to the second content provider and the first placement opportunity information service communicatively connected to the first content provider.

21. The system of claim 20, further comprising:
wherein the first router transmits first data between the first placement opportunity information service and the advertisement decision service owned by the first content provider,
wherein the second router transmits second data between the second placement opportunity information service and the advertisement decision service owned by the second content provider, and
wherein the first data and the second data provide information for enforcing the at least one stipulation pertaining to percentages of ownership of inventory.

22. A non-transitory computer readable storage medium including instructions that, when executed by a processing system, causes the processing system to perform operations, comprising:
retrieve from a memory a first inventory policy provided by a first content provider;
retrieve from the memory a second inventory policy provided by the second content provider;
verify that the first inventory policy and the second inventory policy are in agreement for at least one stipulation pertaining to a percentage of compensation to the first content provider for inventory owned by the first content provider and played by the second content provider;
transmit the first inventory policy to a second placement opportunity information service (POIS) communicatively connected to the second content provider; and
transmit the second inventory policy to a first placement opportunity information service (POIS) communicatively connected to the first content provider.

* * * * *